CASE SHIFT AND RELATED FEATURES

Filed April 17, 1959

2 Sheets-Sheet 1

INVENTORS
SALVATORE J. INTAGLIATA
RICHARD W. YERKS
BY Charles L. Allyn
ATTORNEY

CASE SHIFT AND RELATED FEATURES

Filed April 17, 1959

INVENTORS.
SALVATORE J. INTAGLIATA
RICHARD W. YERKS
BY Charles C. Allyn
ATTORNEY 2,946,421

CASE SHIFT AND RELATED FEATURES

Salvatore J. Intagliata, Windsor, and Richard W. Yerks, Manchester, Conn., assignors to Underwood Corporation, New York, N.Y., a corporation of Delaware Filed Apr. 17, 1959, Ser. No. 807,169

9 Claims. (Cl. 197—5)

This invention relates to power operated case shift mechanisms for typewriters in general, and in some respects also to provision associated with various control keys in typewriters which compels the institutions of typing and case shifting operations sufficiently spaced in time to prevent misoperation of the machine. Certain aspects of the invention relate to the control of two or more typewriters by a common control source, each typewriter being appropriately governed so that case shifting and typing operations in each machine are spaced to occur orderly without detrimental operational overlap.

A power operated case shift mechanism of the general kind is employed wherein an element is given partial power turns to effect respectively the movement of a case shift body oppositely between an upper and a lower case position, each such movement being preferably effected with the harmonic motion characteristic. Such a mechanism is disclosed in the patent to Helmond No. 2,275,759, dated March 10, 1942, and has long been in use in regularly marketed Underwood all-electric typewriters. It functions efficiently and reliably, and with a minimum of attendant shock and noise as each case shift movement is commenced or completed. The control mechanism of such case shift mechanism conventionally comprises a case shift key and a case shift lock key, each of which keys upon its operation needs to remain actuated to facilitate the making of a typing operation in upper case. For that reason it has been impractical to associate these case shift keys with a cross lock mechanism involving the usual typing keys and other keys, allowing the operation of only one key at one time.

It is a feature and object of the invention to control a power case shift mechanism of the general kind stated, by a lower case and an upper case control element or key in an efficient and reliable manner whereby each such element or key by its operation will cause a placement of the case shift body in the appropriate case position and is capable of immediate restoration without further effect on the case shift body.

The fulfillment of this object in turn facilitates the use of a key-governing or locking feature for the type keys, each of the stated case shift keys and other keys in the machine, whereby only one of these keys is operable at a time and whereby the operations severally institutable under control of such keys are compelled to be spaced by a safe time factor. The stated governing feature may be provided in any form. For example it may be of the kind shown in the patent to Pasinski, No. 2,043,393, dated June 9, 1936, or of the form shown in the patent to Schroder No. 2,835,369, dated May 20, 1958.

Another object is thus to construct an efficient case shift mechanism of the stated general kind, appropriately correlated with a key-operation governing mechanism, in a manner so that the control keys of the machine, such as the type keys and the stated case shift keys, are operable only one at a time and with appropriately spaced operational effects.

It is a still further object of the invention to provide efficient devices whereby the case shift mechanism of a first typewriter will control electromagnetic control devices of a case shift mechanism of a second typewriter to cause it to mimic the case shift movements of the first typewriter with a certain time delay, in appropriate coordination with respect to typing operations effected in the same machine.

It is also an important object of the invention to provide an efficiently controllable and effective case shift mechanism in typewriters that are part of a data processing system of machines, such as is disclosed for example in an application of Intagliata et al. No. 725,637, filed April 1, 1958.

Other objects and features will be in part obvious and in part be pointed out, particularly as the following description of a preferred embodiment of the invention proceeds.

Referring now to the drawings.

Figures 6, 7:
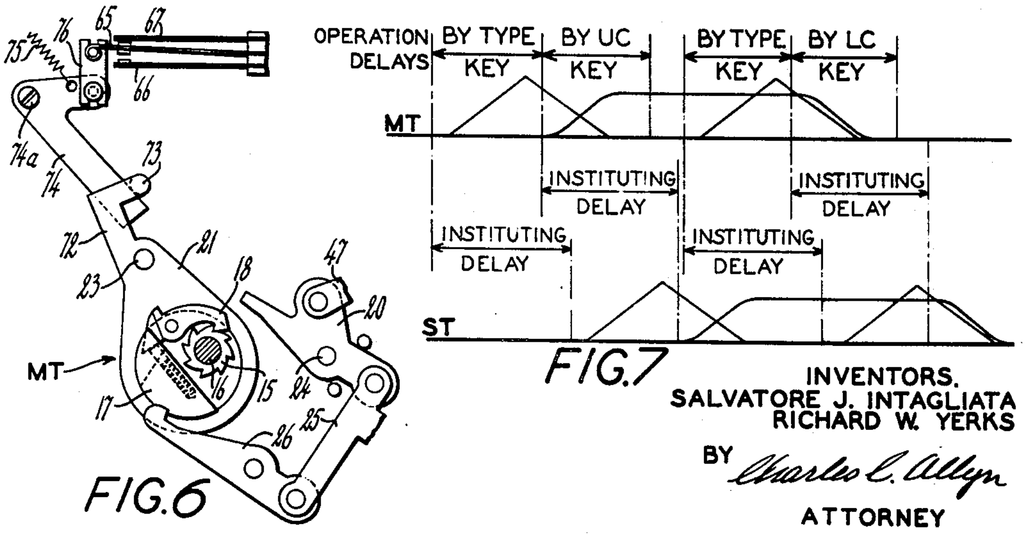
Figure 6 is a view similar to Figure 4, but the case shift mechanism is shown halfway operated from upper case to lower case position.

Finally, Figure 7 is a schematic operation-representing diagram, illustrating in its top portion certain operational time delays enforced in the master typewriter by the stated key interlocking mechanism and illustrating further in a lower portion operational delays in the slave typewriter with reference to corresponding operations in the master typewriter.

In the various figures of the drawings, the master typewriter is designated MT and the slave typewriter ST. Such typewriters include a general framework having each spaced left and right side walls 12. Type bars 13 in each machine, indicated in Figure 1 by dot-and-dash lines, are striking against a platen 14, the latter being provided on a usual letter feeding carriage, not shown. Said type bars 13, in each machine, are operable by a power mechanism, selectively, in the manner fully disclosed in the patent to Yaeger No. 2,254,764, dated September 2, 1941, but not shown. In each of the typewriters MT and ST there is a type bar supporting body 10 case shiftable substantially vertically from a lower case position, downwardly to an upper case position, and reversely, all as fully disclosed in the stated Patent No. 2,275,759.

Each of the typewriters includes a power operated case shift mechanism. Most parts of such mechanisms in the two machines are identical, and thus as far as possible are identified in both machines by the same reference numerals. It will thus suffice to describe this mechanism for the most part in reference to the master typewriter MT only. It comprises at a point beyond the left side wall 12 of such master, a toothed wheel 15 which is fast on a shaft 16 and constantly power driven clockwise therewith when the machine is in use. An eccentric 17 is provided on said shaft 16, and such eccentric is normally quiescent and the said shaft turning therein. Said eccentric 17 is adapted to be clutched to the toothed wheel to turn in unison therewith. For this purpose a clutch pawl 18 is pivotally carried on the eccentric, and under the control of a dog 20 stands normally clear of the wheel 15. The same as in said Patent 2,275,759, the said eccentric 17 controls the case shift position of the type bar supporting body 10, through a pitman 21 which has pivotal connection at 23 with a rocker 22. The dog 20 is pivotally supported at 24 and has pivotal connection with another pivotal dog 26 by means of a link 25. To effect an upper case shift, the dog 20 is moved clockwise clear of the clutch pawl 18, causing the latter under spring tension to engage the toothed wheel 15. Consequently the eccentric 17 will commence to be power driven clockwise. After a half turn of the eccentric the dog 26 will intercept the clutch pawl 18 and disengage it. Consequently the eccentric will establish the stated body 10 in its upper case position. If subsequently movement of the dogs 20, 26 is effected back to the normal position, another half power turn of the eccentric 17 will take place and the stated body will again become deposited in the lower case position as in Figure 1. The eccentric 17 has unitarily turnable therewith an element 27 wherewith a spring pressed detent 28 cooperates to prevent reverse rotation of the eccentric as each of its half turn positions is reached. This assures that the clutch pawl 18 will be held free of the toothed wheel 15 as each half turn position of the eccentric is reached. So far as described to this point, the power case shift mechanism is identical in both typewriters MT and ST.

Figures 4, 5:
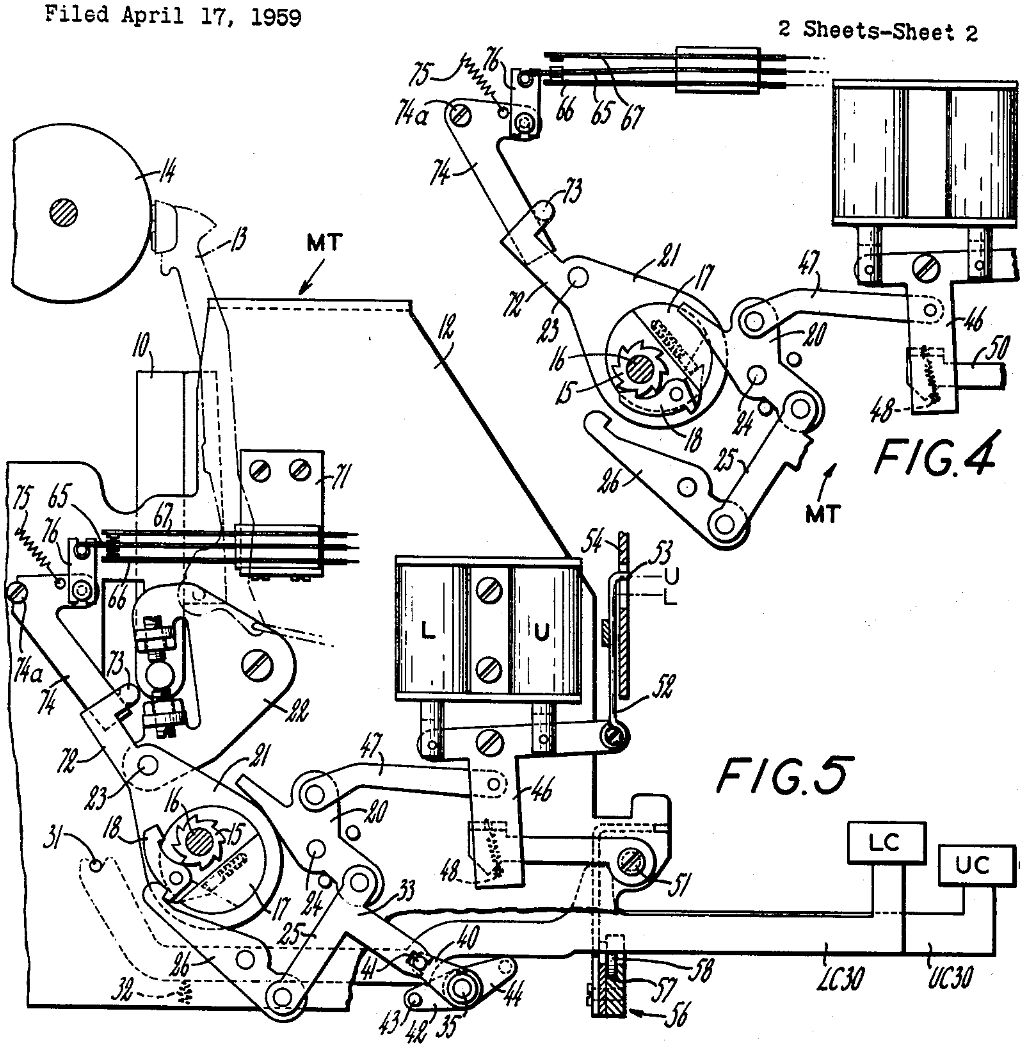
Figure 4 is a right-hand side elevation showing the power case shift actuating mechanism of the master typewriter moved about halfway from lower case toward upper case position.
Figure 5 is a left-hand side elevation of a portion of the master typewriter, the case shift mechanism being shown actuated to upper case position.

The master typewriter has a lower case key LC and an upper case key UC. These keys are provided on levers LC30 and UC30 which both have individual pivotal support on a rod 31 and are individually urged to their normal positions by springs 32, see Figures 1 and 5. The said keys LC and UC, when respectively operated, have rocking effect in opposite directions on the pair of clutch controlling dogs 20, 26. To this end there is associated with a fork extension 33 of the link 25, a rockable structure 34. The latter includes a rock shaft 35 in a sleeve stud 36 provided fast on the left side wall 12 of the machine, said stud having a collar 37 and being clamped to the side wall by a nut 38. The said rockable structure has an arm 40 fast on the outer end of the shaft 35 and by a pin 41 meshes with the stated fork extension 33. A rearwardly reaching arm 42 fast on the inner end of the shaft 35 has a pin 43 underlying the key lever UC30. Similarly a forwardly reaching arm 44 has a pin underlying the key lever LC30. In the illustration of the typewriter MT in Figure 1, the key LC has last been operated so that the rockable structure 34 stands clockwise operated. Of course, this means that to cause a case shift to lower case sometime before, the clutch controlling dogs 20 and 26 were operated counterclockwise to their positions shown in Figure 1. If in Figure 1 the UC key is depressed, the control dog 20 will be withdrawn and the other dog 26 will then become controlling, so that a half turn of the eccentric 17 will ensue and will effect a case shift of the body 10 to upper case position. Operations of the case shift keys LC and UC respectively will thus cause each time a related power case shift, it being understood that the rockable structure 34 will remain each time in the position to which it has been rocked. Furthermore, each key LC and UC upon having been fingered will restore immediately, which is important as will become evident hereinafter.

Opposite rocking of the control dogs 20 and 26 may also be effected under the control of a tape reader, not shown, as for example in the data processing system which is disclosed in said application Ser. No. 725,637. Namely, a reader governed by a record tape may control switches 45 to issue appropriate operating impulses to a lower case control solenoid L or an upper case control solenoid U. These solenoids are both secured to the left side wall 12 of the typewriter MT. The lower ends of the armatures of these solenoids are pivotally connected with opposite, fore-and-aft extending, arms of a three-armed lever 46, the third arm of which has a link connection 47 with the clutch control dog 20. With a pin 48 on said third arm there is cooperative a spring pressed detent arm 50, so that said lever 46 is held in either position to which it is moved and in turn the dogs 20, 26 are also held as moved. Said arm 50 is pivotally carried at 51 upon the side wall 12 of the machine. Obviously, the described detenting provision is effective to hold the dogs whether they are moved or repositioned under the control of the stated solenoids or the keys LC or UC.

The forwardly reaching arm of the three-armed lever has articulated to it and upreaching therefrom, an element 52 which has a pointer 53 visual to the operator through a slot in a front panel 54 of the machine. Said front panel has indices U and L wherewith said pointer 53 cooperates to indicate the prevalent case shift position of the machine. Obviously, because the case shift keys UC and LC are adapted to restore immediately upon operation, they afford no indication of the prevalent case shift state. Because of the capability of the case shift keys LC and UC to restore immediately upon being fingered, they are capable of useful association with a key interlocking mechanism involving the type keys 55 as also other keys in the machine.

Figures 1, 2, 3:
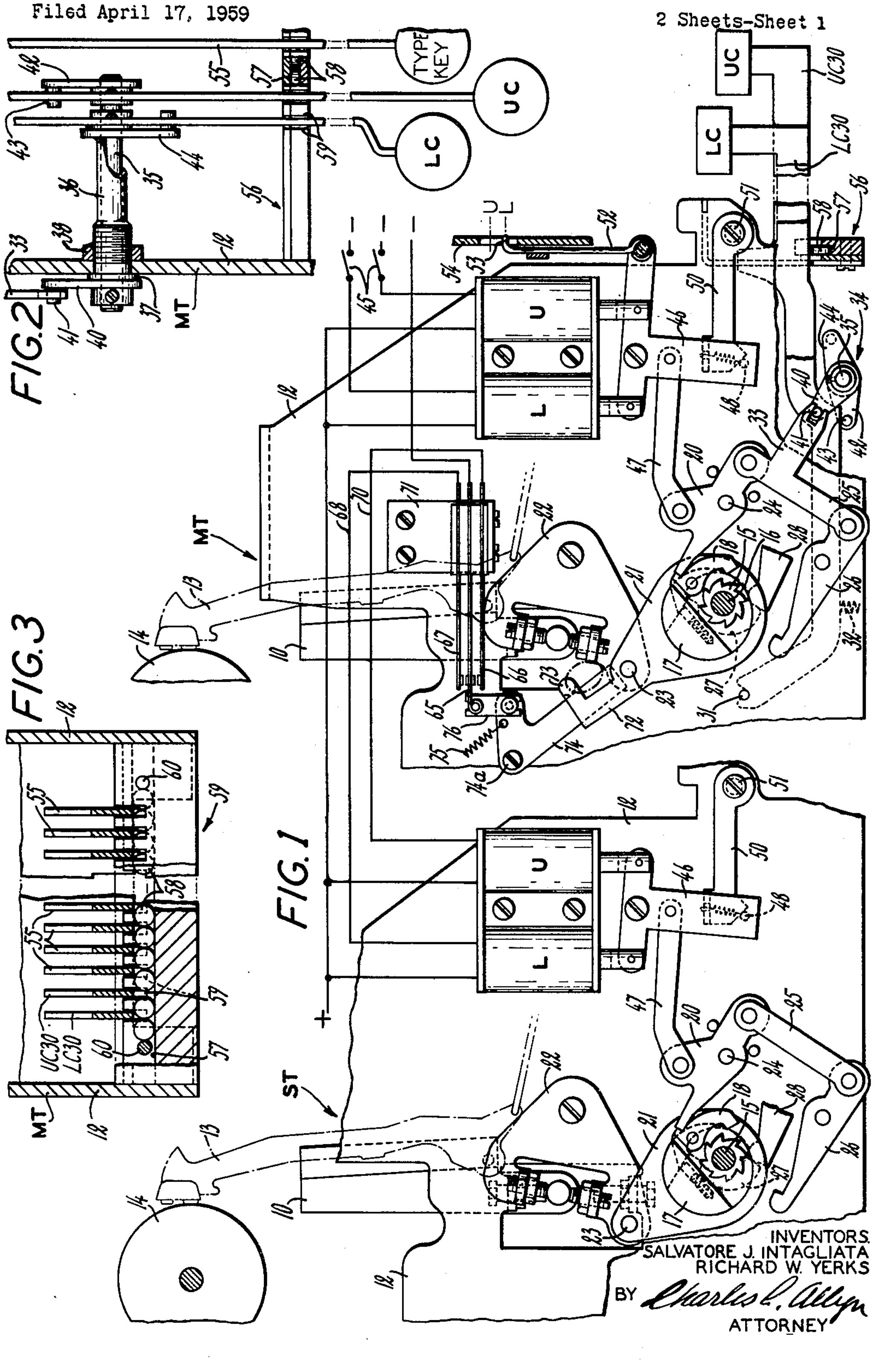
Figure 1 is a fragmentary, left-hand side elevation of a master typewriter electrically connected with a slave typewriter, incorporating the features of the invention.
Figure 2 is a fragmentary plan view of a portion of the master typewriter, illustrating two case shift control keys, a type key and an associated key cross lock mechanism.
Figure 3 is a fragmentary, sectional front elevation of the key cross lock seen in Figure 2.

By way of example, see Figures 2 and 3, there is employed a key interlocking mechanism of the kind shown in the aforestated Pasinski patent. Namely, a bar structure 56 is provided fast in the machine and has in a groove 57 extending lengthwise thereof, a series of adjacent rollers 58. The key levers LC and UC, the type keys 55, as well as some other keys are adapted to be operated to enter between said rollers only one at a time. This is so because left and right abutment elements 60 wherebetween the rollers lie in said groove, leave between the said rollers 58 a total play equivalent to the thickness of one of the stated overlying key levers. Only one of the stated keys is thus sufficiently depressible at one time to cause an operation, wherefore typing and case shifting operations are governed to occur safely timed in respect to each other. The bar 56 has transverse slots 59 wherein the key levers are accommodated for limited downward movement.

Simple and efficient control devices are provided whereby the slave typewriter ST will automatically mimic the case shift operations of the master typewriter MT, appropriately correlated in timing respectively to the typing operations performed in the same machine.

The typing operations in the typewriter ST are instituted automatically under the control of the power operated type actions in the typewriter MT. The particular manner in which this may be done is unimportant but may be as disclosed in the said application Ser. No. 725,637. It will suffice to state that the operations of the type actions in the typewriter ST are appreciably delayed in respect to the equivalent operations in the typewriter MT. The delay is schematically depicted in Figure 7. An operation followed by a restoration of a type action in the typewriter MT is represented in the upper left part of said figure by an inclining straight line followed by a declining line. In the lower part of Figure 7 the correspondirng typing operation in the typewriter ST is represented by similar inclining and declining lines, and it will be seen that such operation is instituted with a certain time delay respective to the equivalent operation in the typewriter MT.

It follows that the case shifting operations in the typewriter ST must be delayed by a substantially corresponding time factor. In the typewriter MT, a case shift to upper case is possible only after any precedingly operated type key has substantially restored and thus the key interlocking rollers 58 allow a depression of the case shift key UC. In Figure 7, such a case shift in the typewriter MT is represented by an upward curve, while a lower case shift is represented by a downward curve rightwardly thereof.

The invention provides simple and efficient means whereby the case shift operations in the slave ST are always delayed by a time factor substantially equal to the delay of operation of the type actions in the slave ST over the type actions in the master MT. In said Figure 7, the typing and case shift instituting delays of the slave typewriter ST over the master typewriter are readily apparent by the comparison of the lower diagram portion with the upper diagram portion.

The structure whereby the slave ST will mimic the case shift operations of the master MT by a required time delay, will now be described.

The slave ST includes a solenoid U and a solenoid L, the same as the master MT, and operations of such solenoids are adapted to rock in the slave a three-armed lever 46 exactly as in the master MT. Such three-armed lever 46 in the slave is adapted to control the case shift eccentric 17 in the slave to cause the required case shift movement. On the master MT is a leaf contact 65 which normally has open-contact relation with a lower case contact 67 and an upper case contact 66. Such contacts are respectively connected by leads 68 and 70 to the solenoids L and U in the slave. The leaf contacts 65, 66 and 67 are dielectrically mounted on a bracket 71 provided on the adjacent machine wall 12. The leaf contact 65 has a downward bias tending to move it into closed contact relation with the leaf 66. The pitman 21 of the master MT has an extension 72 which by a laterally projecting pin 73 controls the position of a bell crank 74, the latter having pivotal support at 74a on the adjacent wall. A spring 75 keeps said bell crank 74 forwardly urged against the pin 73. A link 76 of dielectric material is interposed between the forwardly reaching arm of said bell crank 74 and the switch leaf 65. In the movement of the eccentric 17 from lower case to upper case position, the pin 73 describes a half orbit starting rearwardly. In approach of the middle of such half orbit, the link 76 allows the leaf 65 to make contact momentarily with the leaf 66 and sends an operating impulse to the upper case operation instituting solenoid U in the slave ST. In the movement of the eccentric 17 of the master MT from its upper case to its lower case position, the pin 73 moves in another half orbit, toward the middle of which, see Figure 6, the contact leaf 65 touches the contact 67 and transmits an impulse to the lower case operation instituting solenoid L of the typewriter ST. It will be perceived that in effect the case shift eccentric 17 causes appropriate contact closures for the case shift instituting solenoids in the slave ST to cause the latter to mimic appropriately timed the related case shift operations in the master MT.

Obviously, the parts just described are so correlated that the delay at which the slave ST will execute the respective case shift movements is substantially identical to the delay at which the type actions in the slave operate.

The various features of the invention are capable of embodiment in various forms and variations may be resorted to within the scope of the invention, and portions of improvements may be used without others.

Having thus described our invention, we claim:

1. The combination in a typewriter having a case shift body oppositely movable to take up a lower or an upper case position, of an element adapted by respective part turns to case shift said body oppositely between the said two case shift positions, a rotative power member for driving said element, a depressible lower case key, a depressible upper case key, means movable by the depression of one of said keys to take up one position, and movable oppositely by the depression of the other of said keys to take up another position, and means associated with said element and said power member and controlled by said movable means to cause one of said part turns of said element whenever said movable means is moved to said one position, and to cause the other of said part turns of said element whenever said movable means is moved to said other position.

2. The invention as set forth in claim 1, spring means to restore each of said keys upon the release of operating pressure thereon and independently of said movable means, and means at the front of the typewriter and controlled by the said movable means to indicate the prevailing case shift position of said body.

3. The combination in a typewriter having a case shift body oppositely movable to take up a lower or an upper case position, of an element adapted by respective part turns to case shift said body oppositely between the said two case shift positions, a rotative power member for driving said element, a depressible lower case key, a depressible upper case key, means movable by the depression of one of said keys to take up one position, and movable oppositely by the depression of the other of said keys to take up another position, and means associated with said element and said power member and controlled by said movable means to cause said power member to drive said element one of said part turns whenever said movable means is moved to said one position, and to cause it to drive said element the other part turn whenever said movable means is moved to said other position, said movable means comprising a structure oppositely rockable by said depressible keys.

4. The combination in a typewriter having a case shift body oppositely movable to take up a lower or an upper case position, of an element adapted by respective part turns to case shift said body oppositely between the said two case shift positions, a rotative power member for driving said element, a depressible lower case key, a depressible upper case key, means movable by the depression of one of said keys to take up one position, and movable oppositely by the depression of the other of said keys to take up another position, means associated with said element and said power member and controlled by said movable means to cause said power member to drive said element one of said part turns whenever said movable means is moved to said one position, and to cause it to drive said element the other part turn whenever said movable means is moved to said other position, means to bias each of said keys to restore independently of said movable means at release of operating pressure thereon, type keys, and means associated with all of said keys to make effective depressions thereof possible only one at a time.

5. The combination in a typewriter having a case shift body oppositely movable to take up a lower or an upper case position, of an eccentric, a pitman operable by said eccentric and adapted by respective half turns thereof to case shift said body oppositely between the said two case shift positions, a rotative power member for driving said eccentric, a depressible lower case key, a depressible upper case key, means to bias said keys to restore, means movable by the depression of one of said keys to take up one position, and movable oppositely by the depression of the other of said keys to take up another position, means to hold impositively said movable means in either of said positions, and clutch means associated with said eccentric and said power member and controlled by said movable means to cause one of said half turns of said eccentric whenever said movable means is moved to said one position, and to cause the other half turn of said eccentric whenever said movable means is moved to said other position.

6. The combination in a typewriter having a case shift body oppositely movable to take up a lower or an upper case position, of an element adapted by respective part turns to case shift said body oppositely between the said two case shift positions, a rotative power member for driving said element, means movable to take up one position and movable oppositely to take up another position, a depressible lower case key, a depressible upper case key, two electromagnetic means, means to actuate said movable means to said one position by the depression of said lower case key or by the operation of one of said electromagnetic means and means to actuate said movable means to said other position by the depression of said upper case key or by operation of said other one of said electromagnetic means, and means associated with said element and said power member and controlled by said movable means to cause one of said part turns of said element whenever said movable means is moved to said one position, and to cause the other of said part turns of said element whenever said movable means is moved to said other position.

7. A machine system comprising a master typewriter and a slave typewriter operatively controllable by the master typewriter and including typing means in the slave typewriter which operate with a given delay in respect to typing means in the master typewriter, said typewriters comprising each a case shift body oppositely movable to take up a lower or an upper case position, an element adapted by respective part turns to case shift said body oppositely between said two case shift positions, a rotative power member for driving the said element, means movable to take up one position and movable oppositely to take up another position and means associated with said element and said power member and controlled by the movable means to cause one of said part turns of such element whenever said movable means is moved to take up said one position and to cause another of said part turns of the same element whenever said movable means is moved to take up said other position, the said slave typewriter comprising further two electromagnetic devices, means to operate the movable means in said slave typewriter to said one and to said other of its two positions, respectively by the operations of one and the other of said electromagnetic devices, said master typewriter comprising further a depressible lower-case key, a depressible upper-case key, means to operate the movable means in said master typewriter respectively to said one and to said other of its two positions by the depressions respectively of said one and said other key, and switch means controlled by the said element of the master typewriter to energize in the respective part turns at given points thereof respectively the said electromagnetic devices.

8. The invention set forth in claim 7, the master typewriter including means to bias each of said keys to restore independently of the movable means at release of operating pressure thereon, typing keys, and means associated with all of said keys to make effective depressions thereof possible only one at a time.

9. A machine system comprising a master typewriter and a slave typewriter operatively controllable by the master typewriter, said typewriters comprising each a case shift body oppositely movable to take up a lower or an upper case position, an eccentric, a pitman adapted by respective half turns of said eccentric to case shift said body oppositely between said two case shift positions, a rotative power member for driving the said eccentric, means movable in one direction to take up one position and movable in an opposite direction to take up another position and means associated with said eccentric and said power member and controlled by the movable means to cause one of said half turns of such eccentric whenever said movable means is actuated in one direction and to cause another of said half turns of the same eccentric whenever said movable means is moved in said other direction, the said slave typewriter comprising further two electromagnetic devices adapted to operate the movable means in said slave typewriter to said one and to said other of its two positions, respectively by their operations, said master typewriter comprising means to operate the movable means thereon respectively to said one and to said other of its two positions, and switch means controlled by the pitman of the master typewriter to energize in the course of opposite strokes thereof at given points, respectively one and the other of said electromagnetic devices.

References Cited in the file of this patent

UNITED STATES PATENTS

| | | |
|---|---|---|
| 2,168,441 | Doty | Aug. 8, 1939 |
| 2,797,790 | Blodgett | July 2, 1957 |